(12) United States Patent
Kanazawa et al.

(10) Patent No.: US 11,792,553 B2
(45) Date of Patent: Oct. 17, 2023

(54) END TO END NETWORK MODEL FOR HIGH RESOLUTION IMAGE SEGMENTATION

(71) Applicant: Google LLC, Mountain View, CA (US)

(72) Inventors: Noritsugu Kanazawa, San Jose, CA (US); Yael Pritch Knaan, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 133 days.

(21) Appl. No.: 17/097,184

(22) Filed: Nov. 13, 2020

(65) Prior Publication Data

US 2021/0067848 A1 Mar. 4, 2021

Related U.S. Application Data

(63) Continuation of application No. 16/339,122, filed as application No. PCT/US2017/053627 on Sep. 27, 2017, now Pat. No. 10,860,919.

(51) Int. Cl.
*H04Q 9/00* (2006.01)
*A61H 33/06* (2006.01)
(Continued)

(52) U.S. Cl.
CPC .............. *H04Q 9/00* (2013.01); *A61H 33/06* (2013.01); *A61H 33/063* (2013.01); *G08C 19/00* (2013.01);
(Continued)

(58) Field of Classification Search
CPC .................................................. G06N 3/0454
See application file for complete search history.

(56) References Cited

U.S. PATENT DOCUMENTS 9,824,294 B2 11/2017 Ruan et al.
9,892,361 B2 2/2018 Nguyen et al.
(Continued)

FOREIGN PATENT DOCUMENTS

CN 106557776 4/2017
GB 2538847 11/2016
(Continued)

OTHER PUBLICATIONS

Chen et al., "Semantic Image Segmentation with Task-Specific Edge Detection Using CNNs and a Discriminatively Trained Domain Transform", arXiv:1511.03328v2, Jun. 2, 2016, 14 pages.
(Continued)

*Primary Examiner* — Fabricio R Murillo Garcia
(74) *Attorney, Agent, or Firm* — Dority & Manning, P.A.

(57) ABSTRACT

The present disclosure provides systems and methods that leverage neural networks for high resolution image segmentation. A computing system can include a processor, a machine-learned image segmentation model comprising a semantic segmentation neural network and an edge refinement neural network, and at least one tangible, non-transitory computer readable medium that stores instructions that cause the processor to perform operations. The operations can include obtaining an image, inputting the image into the semantic segmentation neural network, receiving, as an output of the semantic segmentation neural network, a semantic segmentation mask, inputting at least a portion of the image and at least a portion of the semantic segmentation mask into the edge refinement neural network, and receiving, as an output of the edge refinement neural network, the refined semantic segmentation mask.

20 Claims, 9 Drawing Sheets

(51) Int. Cl.
*G08C 19/00* (2006.01)
*H04L 12/40* (2006.01)
(52) U.S. Cl.
CPC ...... *H04L 12/40* (2013.01); *A61H 2201/0176* (2013.01); *A61H 2201/0207* (2013.01); *A61H 2201/5007* (2013.01); *A61H 2201/5012* (2013.01); *A61H 2201/5071* (2013.01); *A61H 2201/5082* (2013.01); *A61H 2201/5089* (2013.01); *A61H 2201/5092* (2013.01)

(56) References Cited

U.S. PATENT DOCUMENTS

| | | | |
|---|---|---|---|
| 10,032,281 | B1 | 7/2018 | Ghesu et al. |
| 10,402,689 | B1* | 9/2019 | Bogdanovych ...... G06K 9/6256 |
| 10,540,768 | B2 | 1/2020 | Yoo et al. |
| 10,552,977 | B1 | 2/2020 | Theis et al. |
| 2015/0238148 | A1* | 8/2015 | Georgescu ........... A61B 5/7267 600/408 |
| 2017/0148223 | A1* | 5/2017 | Holzer ................. G06F 16/532 |
| 2017/0243053 | A1* | 8/2017 | Li ........................... G06T 7/194 |
| 2017/0262735 | A1 | 9/2017 | Sanchez et al. |
| 2017/0287137 | A1* | 10/2017 | Lin ........................... G06T 7/12 |
| 2018/0144477 | A1 | 5/2018 | Shi |
| 2018/0218502 | A1* | 8/2018 | Golden .................... G06N 3/08 |
| 2018/0253622 | A1 | 9/2018 | Chen |
| 2018/0260951 | A1 | 9/2018 | Yang et al. |
| 2018/0322366 | A1* | 11/2018 | Lim ....................... G06V 10/82 |
| 2018/0330238 | A1 | 11/2018 | Luciw |
| 2018/0336683 | A1 | 11/2018 | Feng et al. |
| 2018/0356514 | A1 | 12/2018 | Lakamraju et al. |
| 2019/0057507 | A1* | 2/2019 | El-Khamy ............. G06V 20/70 |
| 2019/0114774 | A1 | 4/2019 | Zhang |
| 2019/0220746 | A1 | 7/2019 | Liu et al. |
| 2019/0228268 | A1* | 7/2019 | Zhang .................... G06V 10/26 |
| 2019/0236394 | A1 | 8/2019 | Price et al. |
| 2019/0304098 | A1 | 10/2019 | Chen et al. |
| 2020/0082198 | A1 | 3/2020 | Yao et al. |

FOREIGN PATENT DOCUMENTS

| | | |
|---|---|---|
| JP | 201704480 | 1/2017 |
| KR | 1020170038622 | 4/2017 |
| KR | 1020180053108 | 5/2018 |
| WO | WO 2017/132636 | 8/2017 |

OTHER PUBLICATIONS

Iig et al., "Flow Net 2.0: Evolution of Optical Flow Estimation with Deep Networks", arXiv:1612.01925v1, Dec. 6, 2016, 16 pages.
International Preliminary Report on Patentability for Application No. PCT/US2017/053627, dated Apr. 9, 2020, 8 pages.
International Search Report and Written Opinion from PCT/US2017/053627 dated Jun. 25, 2018, 12 pages.
Islam et al., "Label Refinement Network for Coarse-to-Fina Semantic Segmentation", arXiv:1703.00551v1, Mar. 1, 2017, 9 pages.
Lu et al., "Textured Image Segmentation using Autoregressive Model and Artificial Neural Network", Pattern Recognition, vol. 28, Issue 12, Dec. 1995, pp. 1807-1817.
Lu et al., "Textured Image Segmentation using Autoregressive Model and Artificial Neural Network", Proceedings of the International Conference on Systems, Man and Cybernetics, Le Touquet, France, Oct. 17-20, 1993, pp. 624-629.
Newell et al., "Stacked Hourglass Networks for Human Pose Estimation", arXiv:1603.06937v2, Jul. 26, 2016, 17 pages.
Shen et al., "Deep Automatic Portrait Matting", European Conference on Computer Vision, Oct. 8-16, 2016, Amsterdam, The Netherlands, pp. 92-107.
Xu et al., "Deep Image Matting", arXiv:1703.03872v3, Apr. 11, 2017, 10 pages.
Yan et al., "DeepLab: Semantic Image Segmentation with Deep Convolutional Nets, Atrous Convolution and Full Connected CRFs", May 1, 2017, https://cseweb.ucsd.edu/classes/sp17/cse252C-a/CSE252C_20170501.pdf, retrieved on Mar. 11, 2019, 30 pages.
Ghiasi et al., "Laplacian Pyramid Reconstruction and Refinement for Semantic Segmentation", arXIV:1605.02264v2, 16 pages.

* cited by examiner

FIG. 1

END TO END NETWORK MODEL FOR HIGH RESOLUTION IMAGE SEGMENTATION

PRIORITY CLAIM

The present application is a continuation of U.S. application Ser. No. 16/339,122 having a filing date of Apr. 3, 2019, which is a 371 of international application PCT/US2017/053627 having a filing date of Sep. 27, 2017. Applicant claims priority to and the benefit of each of such applications and incorporates each of such applications herein by reference.

FIELD

The present disclosure relates generally to image segmentation. More particularly, the present disclosure relates to a network model for high resolution image segmentation that can be trained from end to end.

BACKGROUND

Image segmentation (e.g., semantic segmentation) can be used to partition a digital image into multiple segments. For example, an image can be segmented into objects with particular boundaries (lines, curves, etc.) or partitioned into elements in a foreground or background of the image. In particular, each pixel of an image can be labeled such that pixels with the same label share certain characteristics. Once segmented, an image can be manipulated, such as by extracting segments or blurring portions of the image according to the segments.

Neural networks, such as convolutional neural networks ("CNNs"), have shown the ability to perform image segmentation. However, due to the computational intensity required to perform the image segmentation, the input and output resolutions into a CNN configured to segment an image are typically limited, such as 256×256, 300×300, or 400×400 pixels. Thus, the segmented image output from such a CNN may be of limited value to a user due to the low resolution of the image.

One technique to increase the resolution of the output segmented image is to up-scale the output segmented image to a higher resolution using a bilateral filter or conditional random field process. However, because the CNN and the up-scaling method are separated processes in such a configuration, the CNN cannot be trained from end to end, such as by by back propagating an output error based on the high resolution segmented image.

SUMMARY

Aspects and advantages of embodiments of the present disclosure will be set forth in part in the following description, or can be learned from the description, or can be learned through practice of the embodiments.

One example aspect of the present disclosure is directed to a computing system, comprising at least one processor, a machine-learned image segmentation model, and at least one tangible, non-transitory computer-readable medium that stores instructions that, when executed by the at least one processor, cause the at least one processor to perform operations. The machine-learned image segmentation model can include a semantic segmentation neural network and an edge refinement neural network. The semantic segmentation neural network can be trained to receive an image and, in response to receipt of the image, output a semantic segmentation mask. The edge refinement neural network can be trained to receive at least a portion of the image and at least a portion of the semantic segmentation mask and, in response to receipt of the at least a portion of the image and at least a portion of the semantic segmentation mask, output a refined semantic segmentation mask. The operations can include obtaining the image, inputting the image into the semantic segmentation neural network, receiving, as an output of the semantic segmentation neural network, the semantic segmentation mask, inputting at least a portion of the image and at least a portion of the semantic segmentation mask into the edge refinement neural network, and receiving, as an output of the edge refinement neural network, the refined semantic segmentation mask.

Another example aspect of the present disclosure is directed to a computer-implemented method of generating a segmentation mask for at least a part of an image. The method can include receiving, at a first neural network, first data derived from the image. The method can further include processing said first data, using the first neural network, to generate an output of the first neural network, wherein said output relates to a first segmentation mask. The method can further include receiving, at a second neural network, second data derived from the image, and data derived from said output of the first neural network. The method can further include generating data relating to a second segmentation mask, comprising processing, using the second neural network, the second data derived from the image and the data derived from said output of the first neural network, such that the second segmentation mask is refined with respect to the first segmentation mask.

Another example aspect of the present disclosure is directed to a computer-implemented method of training an image segmentation model from end to end. The image segmentation model can include a semantic segmentation neural network and an edge refinement neural network. The method can include inputting a training image into the image segmentation model. The method can further include determining a first loss function for the semantic segmentation neural network. The method can further include determining a second loss function for the edge refinement neural network. The method can further include determining a total loss function based at least in part on the first loss function and second loss function. The method can further include training the image segmentation model based on the total loss function.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 1 depicts a block diagram of an example computing system according to example aspects of the present disclosure;

DETAILED DESCRIPTION

Figure 2:
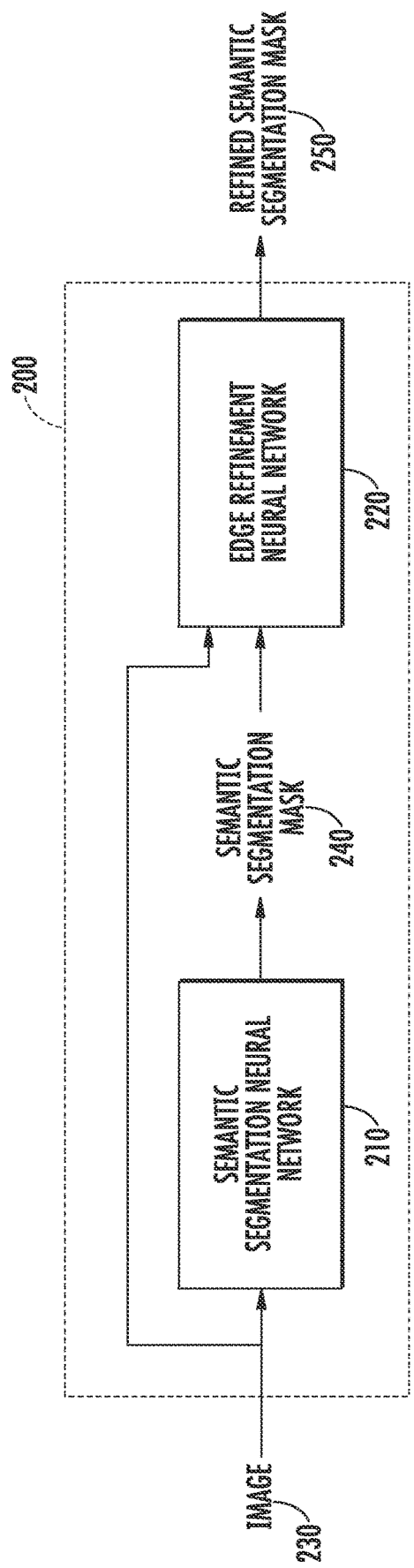
FIG. 2 depicts a block diagram of an example image segmentation model according to example aspects of the present disclosure.

Example aspects of the present disclosure are directed to systems and methods that leverage machine learning to determine a refined semantic segmentation mask of an image. In particular, the systems and methods of the present disclosure can include and use a machine-learned image segmentation model that includes one or more neural networks. In one example, the machine-learned image segmentation model can include a first neural network configured to provide a semantic segmentation mask and a second neural network configured to refine the semantic segmentation mask. In such example, a computing system can receive an image, input the image into the first neural network to receive the semantic segmentation mask, input at least a portion of the semantic segmentation mask and at least a portion of the image into the second neural network, and receive a refined semantic segmentation mask as an output of the second neural network. The refined semantic segmentation mask can be, for example, a semantic segmentation mask of the image with a refined boundary and/or higher resolution as compared to the original semantic segmentation mask. For example, in some implementations, the refined semantic segmentation mask can have sharper edges as compared to the semantic segmentation mask, and/or the refined semantic segmentation mask can more accurately separate the foreground and background of at least a part of the image as compared to the semantic segmentation mask.

In particular, according to an aspect of the present disclosure, the first neural network can be a semantic segmentation neural network (e.g., a CNN) configured to receive an image and determine a semantic segmentation mask of the image. In one example, a user can select an image on a user computing device to provide to the image segmentation model. The computing device can input the image into the semantic segmentation neural network and receive a semantic segmentation mask of the image. The semantic segmentation mask can partition the image into related segments (e.g., a person in a foreground of the image and a background). For example, the segments into which the image is partitioned can be semantically distinct segments that respectively correspond to distinct semantic concepts.

The computing device can provide at least a portion of the semantic segmentation mask and at least a portion of the image to the second neural network. For example, the second neural network can be an edge refinement neural network (e.g., a CNN) configured to receive the semantic segmentation mask and the image and provide a refined semantic segmentation mask as an output of the second neural network. The refined semantic segmentation mask can have refined edges (e.g., more distinct/clearly defined boundaries) between the segmented regions of the image and/or be at a higher resolution than the semantic segmentation mask.

The refined semantic segmentation mask can then be used by the computing device to generate an image with a blurred effect, such as in a background of the image. For example, the image can be blurred in a background area of the image based on the refined semantic segmentation mask to generate a blurred background effect (e.g., a "bokeh" effect). As such, the computing device can generate a blurred background image using a single image and the image segmentation model according to example aspects of the present disclosure.

Further, as will be discussed in greater detail herein, the image segmentation model can be trained from end-to-end in order to determine the refined segmentation mask, thereby allowing for the quality of the refined semantic segmentation mask to be improved via training.

More particularly, in some implementations, a computing system can include at least one processor and at least one tangible, non-transitory computer readable medium that stores instructions that, when executed by the at least one processor, cause the at least one processor to perform operations. The computing system can further include a machine-learned image segmentation model, which can include a semantic segmentation neural network and an edge refinement neural network.

The semantic segmentation neural network can be trained to receive an image and, in response to receipt of the image, output a semantic segmentation mask. For example, the semantic segmentation neural network can be a CNN comprising one or more convolutional layers. The semantic segmentation mask can segment or partition the image into a plurality of segments, such as, for example, a foreground and background or other semantic segments and/or depth layers. In some implementations, the semantic segmentation mask determined by the semantic segmentation can include values for 16 features per pixel or can otherwise be segmented according to 16 channels. Thus, as one example, the depth of the output layer of the semantic segmentation neural network can be 16. Using a plurality of features can allow for predicting a refined semantic segmentation mask more accurately than a single feature semantic segmentation mask. For example, information regarding hair, skin, clothing, body features, etc. can be passed from the semantic segmentation network to the edge refinement network. In other implementations, the semantic segmentation mask can have 2 or 3 channels.

The edge refinement neural network can be trained to receive a least a portion of the image at least a portion of the semantic segmentation mask and, in response, output a refined semantic segmentation mask. For example, the edge refinement neural network can be a CNN comprising one or more convolutional layers. The refined semantic segmentation mask can be refined by, for example, having a higher resolution, more clearly defined boundaries, more accurate boundaries, or other refinement as compared to the semantic segmentation mask.

The instructions can cause the processor to obtain an image, and input the image into the semantic segmentation neural network. For example, a user can use a user computing device to select an image to provide to the image segmentation model. In some implementations, the image segmentation model can be stored on or otherwise included on the user computing device. In some implementations, the image segmentation model can be stored on a remote computing system, and the image can be provided to the remote computing system such as, for example, over one or more wired or wireless networks.

In some implementations, the image can be a high resolution image. As used herein, the term "high resolution" when used in reference to an image refers to a version of an image at a first resolution (e.g., 2048×2048 pixels) which is a higher resolution image than a version of the image at a second resolution (e.g., 256×256 pixels). Similarly, the term "low resolution" when used in reference to an image refers to a version of an image at a resolution that is lower than a version of the image at a higher resolution. The example resolutions provided above are provided as examples only. Many different resolutions can be used for high resolution and low resolution images.

In some implementations, a high resolution image can be input into a semantic segmentation neural network by down-scaling the high resolution image into a low resolution version of the image and inputting the low resolution image into the semantic segmentation neural network. For example, any number of techniques can be applied to down-scale a high resolution image, such as nearest-neighbor interpolation, bilinear and bicubic algorithms, Sinc and Laszos resampling, Fourier transform methods, edge-directed interpolation, vectorization, deep convolutional neural networks, or other down-scaling techniques.

In some implementations, the semantic segmentation neural network can output a low resolution semantic segmentation mask in response to receiving a low resolution image. For example, a low resolution image (e.g., a 256×256 image) can be input into the semantic segmentation neural network, and a corresponding low resolution semantic segmentation mask (e.g., at a corresponding 256×256 pixels) can be output by the semantic segmentation neural network.

According to additional aspects of the present disclosure, at least a portion of the semantic segmentation neural network can be input into the edge refinement neural network. For example, in some implementations, the semantic segmentation mask received from the semantic segmentation neural network can be a low resolution semantic segmentation mask. The low resolution semantic segmentation mask can be up-scaled into a high resolution semantic segmentation mask, and the high resolution semantic segmentation mask can then be input into the edge refinement neural network. For example, in some implementations, the low resolution semantic segmentation mask can be up-scaled back to the original resolution of the high resolution image that was down-scaled to obtain the low resolution image provided to the semantic segmentation neural network.

Additionally, at least a portion of the image can be input into the edge refinement neural network. For example, in some implementations, the high resolution image can be input into the edge refinement neural network along with the high resolution semantic segmentation mask.

In some implementations, the high resolution image can be sampled, such as, for example, by randomly cropping a portion of the high resolution image and providing the cropped portion to the edge refinement neural network. Similarly, in some implementations, a corresponding portion of a high resolution semantic segmentation mask can be cropped and provided to the edge refinement neural network. The portion of the high resolution semantic segmentation mask can be, for example, the same region of the high resolution semantic segmentation mask as was randomly cropped in the high resolution image.

In some implementations, the edge refinement neural network can include two encoder networks that separately receive input. In particular, as an example, the image (or a portion thereof) can be input into a first encoder network of the edge refinement neural network, and the semantic segmentation mask (or a portion thereof) can be input into a second encoder network of the edge refinement neural network. Thus, in some implementations, the edge refinement neural network can be a network which includes two heads, with the first head corresponding to an image encoder network and the second head corresponding to the semantic segmentation mask encoder network. Each encoder network can include one or more convolutional layers which encode either the image or the semantic segmentation mask respectively.

Each encoder network can be configured to output an encoded output. For example, the first encoder network (e.g., the image encoder network) can output a first encoded output (e.g., an encoded image), and the second encoder network (e.g., the semantic segmentation mask encoder network) can output a second encoded output (e.g., an encoded semantic segmentation mask). The edge refinement neural network can concatenate the first encoded output and the second encoded output into a concatenated encoded output. For example, each of the encoder networks can be configured to respectively reduce the resolution of the image or semantic segmentation mask, and the encoded outputs of the two encoder networks can be concatenated when the resolution of each is respectively at its lowest.

The concatenated encoded output can then be provided to a decoder network of the edge refinement neural network. For example, the decoder network can include one or more convolutional layers configured to expand the concatenated encoded output until the resolution of the concatenated encoded output reaches the original input resolution. In some implementations, the decoder network can include an edge inference layer configured to extract the refined semantic segmentation mask. The refined semantic segmentation mask can be received as an output of the decoder network of the edge refinement neural network. The refined semantic segmentation mask can be, for example, at a higher resolution than the semantic segmentation mask received from the semantic segmentation neural network. Additionally, in some implementations, the refined semantic segmentation mask generated by the edge refinement neural network can include 16 features or channels.

Once the refined semantic segmentation mask has been determined by the image segmentation model, at least a portion of the image can be blurred based at least in part on the refined semantic segmentation mask. For example, the refined semantic segmentation mask can segment a person/object in the foreground of an image from the background of the image. In some implementations, the background of the image can be blurred to produce a blurring effect (e.g., a "bokeh" effect). Other depth layers (e.g., layers corresponding to user-selected depths) can be blurred in addition or alternatively to the background.

An advantage provided by the systems and methods according to example aspects of the present disclosure is that the image segmentation model can be trained from end to end. For example, using training data, such as one or more training images, a total loss function can be determined based on the refined semantic segmentation mask. The image segmentation model can then be trained based at least in part on the total loss function.

For example, while neural network models, such as CNNs, have shown the ability to solve many difficult imaging problems, in most cases the input and corresponding output images are typically of low resolution, such as 256×256, 300×300, or 400×400. Typically, the resolution of the input and output images is maintained at a low resolution in order to reduce the amount of calculations required by the neural network model. One technique to improve the resolution quality of an image received as an output of a neural network model is to use one or more upscaling techniques, such as a bilateral filter or conditional random field. However, using such upscaling techniques does not allow for back propagation of errors through the neural network model, thus preventing training of the neural network model by back propagation.

The systems and methods according to example aspects of the present disclosure, however, can allow for the image segmentation model to be trained end to end, such as by back propagation of errors. For example, according to additional example aspects of the present disclosure, an image segmentation model can be trained from end to end by inputting a training image into the image segmentation model. The training image can be, for example, an image from a training dataset comprising a plurality of training images. Each training image can have, for example, corresponding ground-truth versions of a semantic segmentation mask for the image used to train the respective semantic segmentation and edge refinement neural networks.

For example, the training image can be input into the image segmentation model, and a first loss function can be determined for the semantic segmentation neural network. For example, the training image can be input into the semantic segmentation neural network, and a semantic segmentation mask of the training image can be received as an output of the semantic segmentation neural network. In some implementations, a single channel of a semantic segmentation mask can be extracted. For example, in some implementations, the semantic segmentation neural network can extract a single channel from a semantic segmentation mask that includes a plurality of channels by, for example, using an inference layer. The inference layer can be, for example, a layer configured to extract a single channel from the semantic segmentation mask (e.g., a black and white semantic segmentation mask).

The first loss function can be determined by, for example, determining a difference between the semantic segmentation mask and a ground-truth semantic segmentation mask. For example, the ground-truth semantic segmentation mask can correspond to a previously-determined semantic segmentation mask for the training image. The first loss function can describe the difference between the semantic segmentation mask and the ground-truth semantic segmentation mask.

In some implementations, the training image can be a high resolution training image, which can first be down-scaled into a low resolution version of the training image, and the low resolution training image can be input into the semantic segmentation neural network to determine a low resolution semantic segmentation mask. The low resolution semantic segmentation mask (or a single channel thereof) can then be compared to a low resolution ground-truth semantic segmentation mask to determine the first loss function.

In some implementations, the semantic segmentation neural network can be trained based at least in part on the first loss function. For example, the semantic segmentation neural network can be trained by back propagating errors from the semantic segmentation mask as compared to the ground-truth semantic segmentation mask.

The training method can further include determining a second loss function for the edge refinement neural network. For example, the semantic segmentation mask can be received from the semantic segmentation neural network, and at least a portion of the semantic segmentation neural network can be input into the edge refinement neural network along with at least a portion of the training image.

In some implementations, the semantic segmentation mask can be a low resolution semantic segmentation mask, whereas the training image can be a high resolution training image. At least a portion of the high resolution training image can be input into the edge refinement neural network. The low resolution semantic segmentation mask can be up-scaled into a high resolution version of the semantic segmentation mask, and at least a portion of the high resolution semantic segmentation mask can be input into the edge refinement neural network. For example, in some implementations, the training image can be randomly cropped, and a corresponding crop of the high resolution semantic segmentation mask can be cropped, with the cropped section of the training image and corresponding crop of the high resolution semantic segmentation mask input into the edge refinement neural network.

A refined semantic segmentation mask can be received as an output of the edge refinement neural network. The second loss function can be determined based at least in part on a difference between the refined semantic segmentation mask and a ground-truth refined semantic segmentation mask. For example, the ground-truth refined semantic segmentation mask can correspond to a previously-determined refined semantic segmentation mask for the training image. The second loss function can describe the difference between the refined semantic segmentation mask and the ground-truth refined semantic segmentation mask.

In some implementations, the edge refinement neural network can be trained based at least in part on the second loss function. For example, the edge refinement neural network can be trained by back propagating errors from the refined semantic segmentation mask as compared to the ground-truth refined semantic segmentation mask.

The training method can further include determining a total loss function for the image segmentation model based at least in part on the first loss function and second loss function. For example, in some implementations, the total loss function can be determined by summing the first loss function and the second loss function. The image segmentation model can then be trained based on the total loss function. For example, the image segmentation model can be trained by back propagating errors of the total loss function through the image segmentation model.

In some implementations, the semantic segmentation neural network can first be trained by back propagating errors using a first loss function, as described herein. Once the semantic segmentation neural network has been trained to achieve a first loss function below an acceptable threshold, the edge refinement neural network can be trained using a second loss function, as described herein. Once the edge refinement neural network has been trained to achieve a second loss function below an acceptable threshold, the image segmentation model can be trained based at least in part on the total loss function, as described herein.

Thus, the present disclosure provides technical, machine learning based solutions to the technical problem of high resolution image segmentation. One example benefit of the present disclosure is improved image segmentation accuracy/quality. In particular, various implementations can provide a refined segmentation mask which, compared to segmentation masks produced by other methods, is of a higher resolution and/or has refined edges (e.g., more distinct/clearly defined boundaries) between the segmented regions of the image. Moreover, the multi-feature neural networks described herein can offer far richer image segmentation prediction capability as compared to single feature neural networks. As such, the image segmentation models of the present disclosure can provide superior image segmentation accuracy.

In addition to improved image segmentation accuracy/quality, example aspects of the present disclosure can result in a number of additional technical benefits, including, for example, the ability to train the image segmentation model from end to end. For example in various implementations an image segmentation model can be trained using a total loss function comprising losses determined from each neural network, allowing for end to end training by back propagation of errors through both neural networks. This can further allow for refinement of the image segmentation model. Further, in some embodiments, training data sets can be compiled which include ground-truth versions of images, which can be used to individually train the neural networks of an image segmentation model, as described herein. Thus, each neural network can be refined using a subset of training data.

Another example technical benefit of the present disclosure is its relatively low memory usage/requirement. In particular, the neural networks described herein effectively summarize the training data and compress it into compact form (e.g., the neural network itself). This greatly reduces the amount of memory needed to store and implement the image segmentation algorithm. Further, the neural networks described herein can be implemented on a user computing device, such as an individual user's smart phone, or via a networked architecture, allowing for increased flexibility for users.

Another example technical benefit of the present disclosure is improved scalability. In particular, semantically segmenting images through neural networks greatly reduces the research time needed relative to manually developing image segmentation algorithms. For example, a manually developed image segmentation algorithm may need to be manually refined to account for various scenarios. By contrast, to use neural networks as described herein, the image segmentation model can be trained on appropriate training data, which can be done at a massive scale if the training system permits. In addition, the image segmentation model can easily be revised as new training data is made available.

Figure 1:
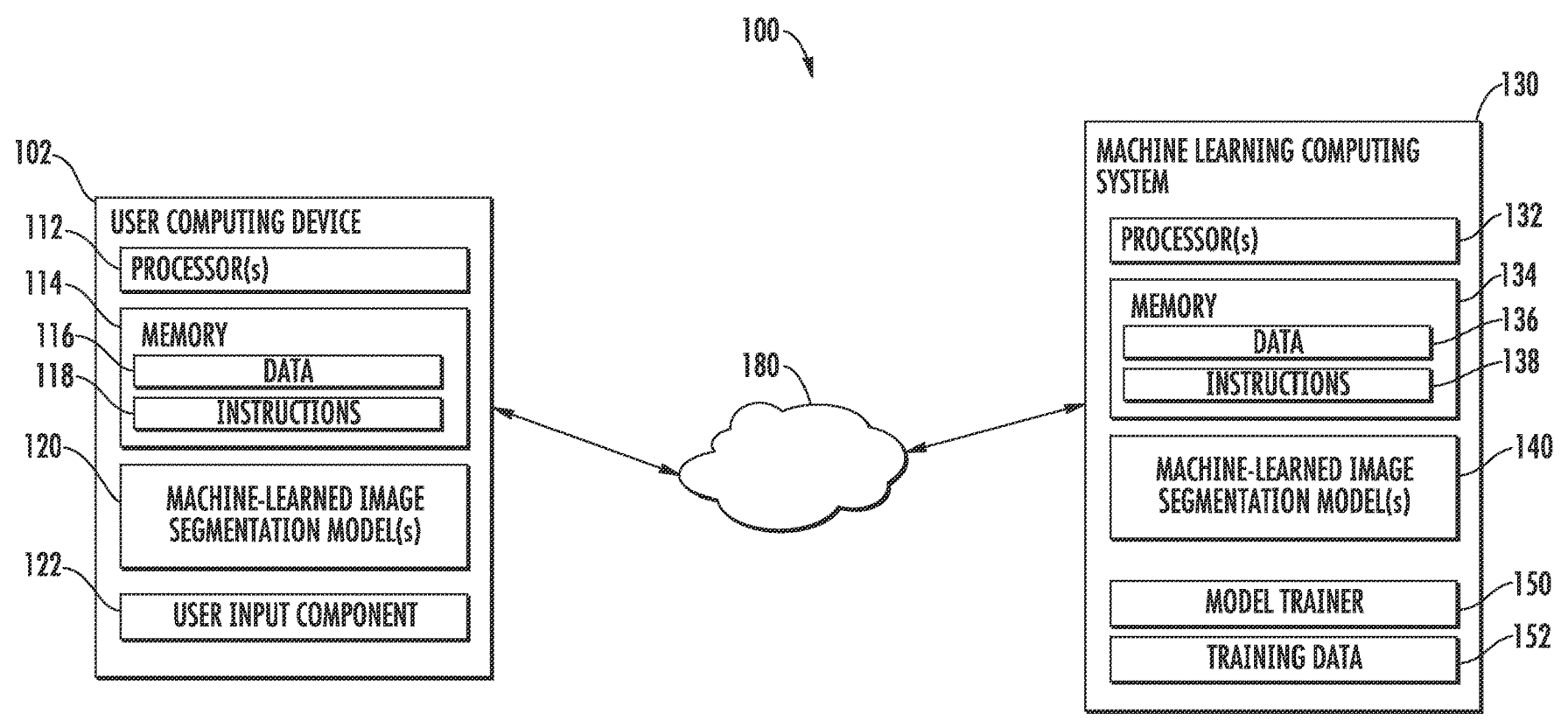

With reference now to the FIGS., example aspects of the present disclosure will be discussed in further detail. FIG. 1 depicts an example computing system 100 configured to perform semantic image segmentation according to example aspects of the present disclosure. The system 100 can include a user computing device 102 and a machine learning computing system 130 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 can include one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The user computing device 102 can store or include one or more image segmentation models 120. For example, the one or more image segmentation models 120 can be received from the machine learning computing system 130 over network 180, stored in the user computing device memory 114, and used or otherwise implemented by the one or more processors 112. In some implementations, the user computing device 102 can implement multiple parallel instances of an image segmentation model 120 (e.g., to perform parallel image segmentation for multiple user input images).

The user computing device 102 can also include a user input component 122 that receives user input by a user interaction. For example, the user input component 122 can be a touch-sensitive component (e.g., a touch-sensitive display screen or a touch pad) that is sensitive to the touch of a user input object (e.g., a finger or a stylus). However, the user input component 122 can include other components that are able to receive user input. For example, the user input component 122 can include a keyboard, mouse, keypad, button, or other component configured to receive user input. The user input component 122 can be used to, for example, select an image to be input into the one or more image segmentation models 120.

The machine learning computing system 130 can include one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the machine learning computing system 130 to perform operations.

In some implementations, the machine learning computing system 130 can include or otherwise be implemented by one or more server computing devices. In instances in which the machine learning computing system 130 includes plural server computing devices, such server computing devices can operate according to sequential computing architectures, parallel computing architectures, or some combination thereof.

The machine learning computing system 130 can store or otherwise include one or more machine-learned image segmentation models 140. For example, the image segmentation models 140 can be or can otherwise include various machine-learned models such as neural networks (e.g., deep recurrent neural networks) or other multi-layer non-linear models. Example image segmentation models 140 are discussed with reference to FIGS. 2-6.

The machine learning computing system 130 can train the image segmentation models 140 via a model trainer 150 and training data 152. In some implementations, a separate training computing system can be remote from the machine learning computing system 130, and can be communicatively coupled to the machine learning computing system 130 via the network 180. Thus, the model trainer 150 can be separate from the machine learning computing system 130 or can be a portion of the machine learning computing system 130.

The model trainer 150 can train the machine-learned models 140 stored at the machine learning computing system 130 using various training or learning techniques, such as, for example, backwards propagation (e.g., truncated back propagation through time). The model trainer 150 can perform a number of generalization techniques (e.g., weight decays, dropouts, etc.) to improve the generalization capability of the models being trained.

In particular, the model trainer 150 can train an image segmentation model 140 based on a set of training data 152. The training data 152 can include ground-truth image data (e.g., ground-truth semantic segmentation masks corresponding to training images). In some implementations, the model trainer 150 can be implemented on or otherwise included in a user computing device 102.

The model trainer 150 can include computer logic utilized to provide desired functionality. The model trainer 150 can be implemented in hardware, firmware, and/or software controlling a general purpose processor. For example, in some implementations, the model trainer 150 includes program files stored on a storage device, loaded into a memory and executed by one or more processors. In other implementations, the model trainer 150 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

In some implementations, an image can be selected by a user via a user input component 122 of a user computing device 102, which image can then be provided to a machine learning computing system 130 via the network 180. In such implementations, the one or more image segmentation models 140 can be used to perform image segmentation, as described herein, and can provide a corresponding segmented image to a user computing device 102 via the network 180.

FIG. 1 illustrates one example computing system 100 that can be used to implement the present disclosure. Other computing systems can be used as well. For example, in some implementations, the user computing device can include the model trainer and the training dataset. In such implementations, the image segmentation models can be both trained and used locally at the user computing device.

Referring now to FIG. 2, a block diagram of an example image segmentation model 200 according to example aspects of the present disclosure is depicted. The image segmentation model 200 can include a first neural network 210 and a second neural network 220 connected together. The first neural network 210 can be semantic segmentation neural network 210 configured to receive an image 230 and output a semantic segmentation mask 240 of the image 230. The second neural network 220 can be an edge refinement neural network 220 configured to receive at least a portion of an image 230 and at least a portion of the semantic segmentation mask 240, and output a refined semantic segmentation mask 250.

The semantic segmentation neural network 210 can be a CNN comprising one or more convolutional layers. The semantic segmentation mask 240 can segment or partition the image 230 into a plurality of segments, such as, for example, a foreground and background or other semantic segments and/or depth layers. In some implementations, the semantic segmentation mask 240 determined by the semantic segmentation can include values for 16 features per pixel or can otherwise be segmented according to 16 channels. Thus, as one example, the depth of the output layer of the semantic segmentation neural network 220 can be 16. Using a plurality of features can allow for predicting a refined semantic segmentation mask 250 more accurately than a single feature semantic segmentation mask 240. For example, information regarding hair, skin, clothing, body features, etc. can be passed from the semantic segmentation neural network 210 to the edge refinement neural network 220. In other implementations, the semantic segmentation mask 240 can have 2 or 3 channels.

The edge refinement neural network 220 can be trained to receive a least a portion of the image 230 and at least a portion of the semantic segmentation mask 240 and, in response, output a refined semantic segmentation mask 250. For example, the edge refinement neural network 220 can be a CNN comprising one or more convolutional layers. The refined semantic segmentation mask 250 can be refined by, for example, having a higher resolution, more clearly defined boundaries, more accurate boundaries, or other refinement as compared to the semantic segmentation mask 240.

Figure 3:
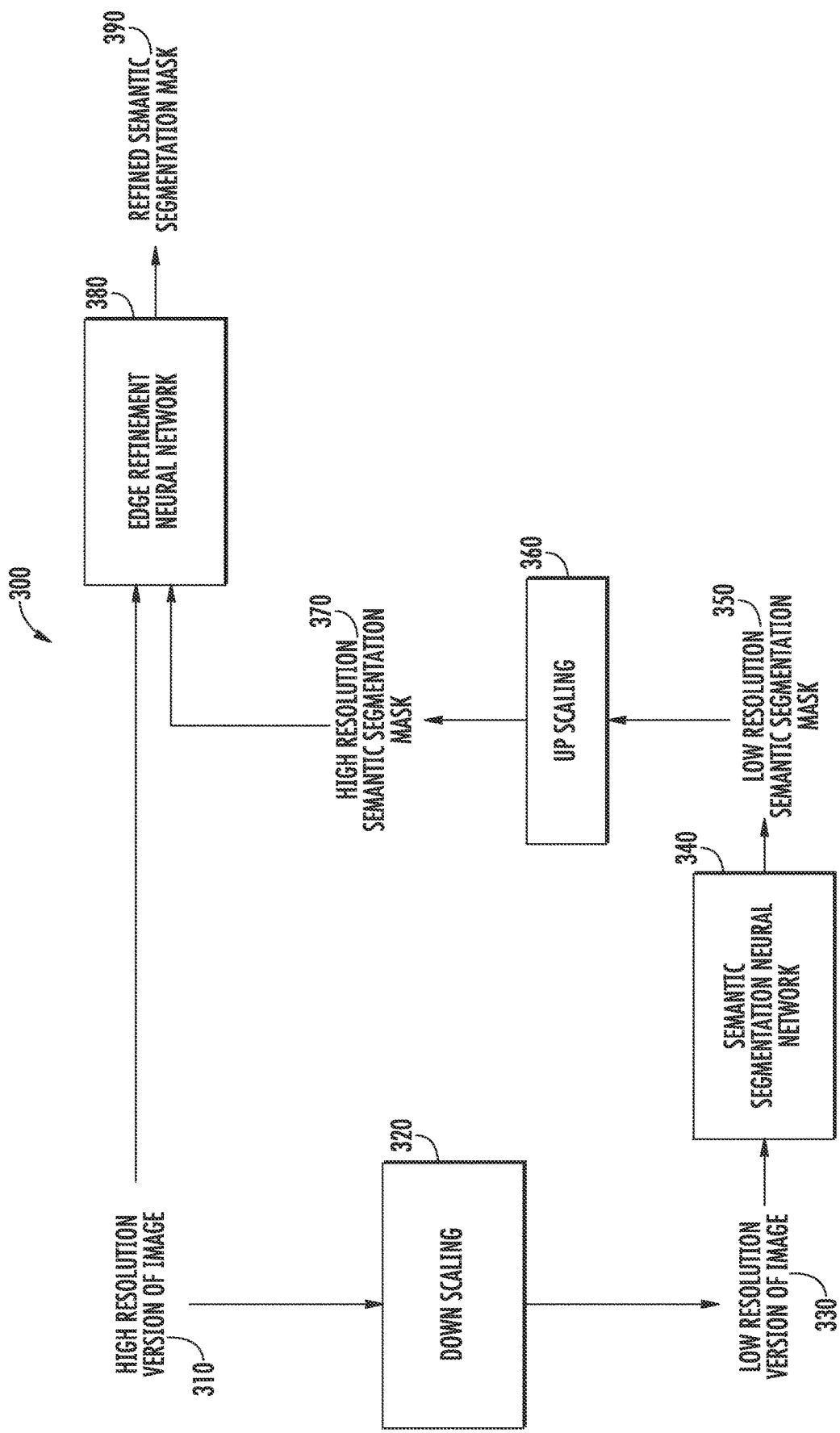
FIG. 3 depicts a block diagram of an example image segmentation model according to example aspects of the present disclosure.

Referring now to FIG. 3, an example image segmentation model 300 according to additional aspects of the present disclosure is depicted. As shown, a high resolution version of an image 310 can be input into a down-scaling component 320 in order to generate a low resolution version of the image 330. For example, the down-scaling component 320 can perform any number of techniques to down-scale the high resolution version of the image 310, such as nearest-neighbor interpolation, bilinear and bicubic algorithms, Sinc and Laszos resampling, Fourier transform methods, edge-directed interpolation, vectorization, deep convolutional neural networks, or other down-scaling techniques.

The down-scaling component 320 can then provide a low resolution version of the image 330 which can be provided to the semantic segmentation neural network 340. As an example, the high resolution version of the image 310 can be an image at a first resolution (e.g., 2048×2048 pixels), whereas the low resolution version of the image 330 can be at a second, lower resolution (e.g., 256×256 pixels).

The semantic segmentation neural network can be, for example, the same or similar semantic segmentation neural network 210 depicted in FIG. 2. The semantic segmentation neural network 340 can then output a low resolution semantic segmentation mask 350. The low resolution semantic segmentation mask 350 can be, for example, at the same resolution as the low resolution version of the image 330. An advantage provided by first down-scaling the high resolution version of the image 310 to a low resolution version of the image 330, and providing the low resolution version of the image 330 to the semantic segmentation neural network 340, is that the computational intensity of determining the low resolution semantic segmentation mask 350 can be considerably less than inputting a high resolution version of the image 310 directly into the semantic segmentation neural network 340.

The low resolution semantic segmentation mask 350 can then be provided to an up-scaling component 360 to generate a high resolution semantic segmentation mask 370. The high resolution semantic segmentation mask 370 can be, for example, at the same resolution as the high resolution version of the image 310. The up-scaling component 360 can perform any number of techniques to up-scale the low resolution semantic segmentation mask 350 to a high resolution semantic segmentation mask 370, such as the inverse of any of the techniques used to down-scale the image by the down-scaling component 320.

At least a portion of the high resolution semantic segmentation mask 370 and the high resolution version of the image 310 can then be provided to the edge refinement neural network 380. The edge refinement neural network 380 can correspond to, for example, the same or similar edge refinement neural network 220 depicted in FIG. 2. The edge refinement neural network 380 can then output a refined semantic segmentation mask 390. The refined semantic segmentation mask 390 can be refined by, for example, having a higher resolution, more clearly defined boundaries, more accurate boundaries, or other refinement as compared to the high resolution semantic segmentation mask 370 and/or the low resolution semantic segmentation mask 350.

Figure 4:
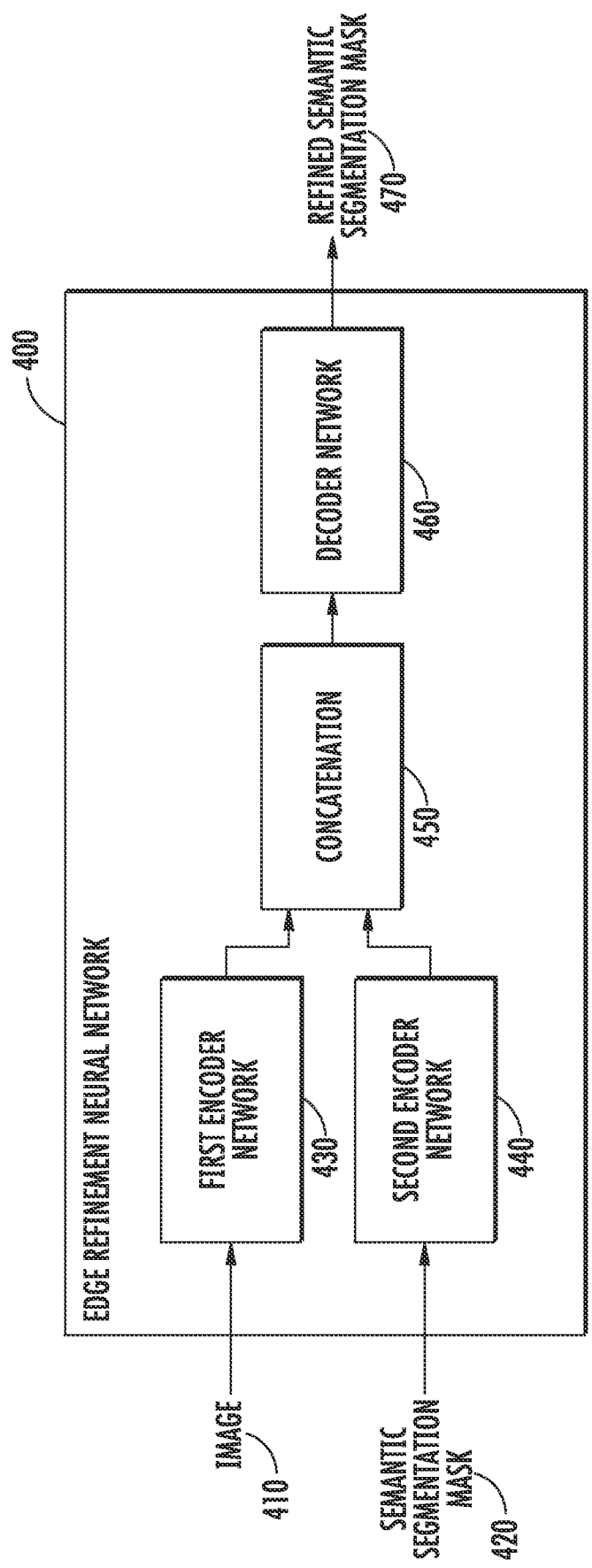
FIG. 4 depicts a block diagram of an example edge refinement neural network according to example aspects of the present disclosure.

Referring now to FIG. 4, a block diagram of an edge refinement neural network 400 according to example aspects of the present disclosure is depicted. The edge refinement neural network 400 can correspond to, for example, the edge refinement neural network 220 depicted in FIG. 2 and/or the edge refinement neural network 380 depicted in FIG. 3. As shown, an image 410 and a corresponding semantic segmentation mask 420 can be input into the edge refinement neural network 400. The edge refinement neural network can include two heads, with the first head corresponding to an image encoder network 430 and the second head corresponding to a semantic segmentation mask encoder network 440. For example, the edge refinement neural network can include a first encoder network 430 and a second encoder network 440. Each encoder network 430 and 440 can include, for example, one or more convolutional layers configured to encode the image 410 and semantic segmentation mask 420, respectively. The image 410 (or a portion thereof) can be provided to the first encoder network 430, which can encode the image into a first encoded output. Similarly, the semantic segmentation mask 420 (or a portion thereof) can be provided to the second encoder network 440 to encode the semantic segmentation mask 420 into a second encoded output. The first encoded output and the second encoded output can then be provided to a concatenation component 450 configured to concatenate the first encoded output and the second encoded output. The concatenation component 450 can concatenate the first encoded output and the second encoded output into a concatenated encoded output. For example, each of the encoder networks can be configured to respectively reduce the resolution of the image 410 or semantic segmentation mask 420, and the encoded outputs of the two encoder networks 430 and 440 can be concatenated when the resolution of each is respectively at its lowest.

The concatenated encoded output can then be provided to a decoder network 460 of the edge refinement neural network 400. For example, the decoder network 460 can include one or more convolutional layers configured to expand the concatenated encoded output until the resolution of the concatenated encoded output reaches the original input resolution of the image 410 and/or semantic segmentation mask 420. In some implementations, the decoder network 460 can include an edge inference layer configured to extract the refined semantic segmentation mask 470. The refined semantic segmentation mask 470 can be received as an output of the decoder network 460 of the edge refinement neural network 400. The refined semantic segmentation mask 470 can be, for example, at a higher resolution than the semantic segmentation mask 420 received from the semantic segmentation neural network. Additionally, in some implementations, the refined semantic segmentation mask 420 generated by the edge refinement neural network can include 16 features or channels.

In some implementations, once the refined semantic segmentation mask 470 has been determined by edge refinement neural network 400, at least a portion of the image can be blurred based at least in part on the refined semantic segmentation mask 470. For example, the refined semantic segmentation mask 470 can segment a person/object in the foreground of an image 410 from the background of the image 410. In some implementations, the background of the image 410 can be blurred to produce a blurring effect (e.g., a "bokeh" effect). Other depth layers (e.g., layers corresponding to user-selected depths) can be blurred in addition or alternatively to the background.

Figure 5:
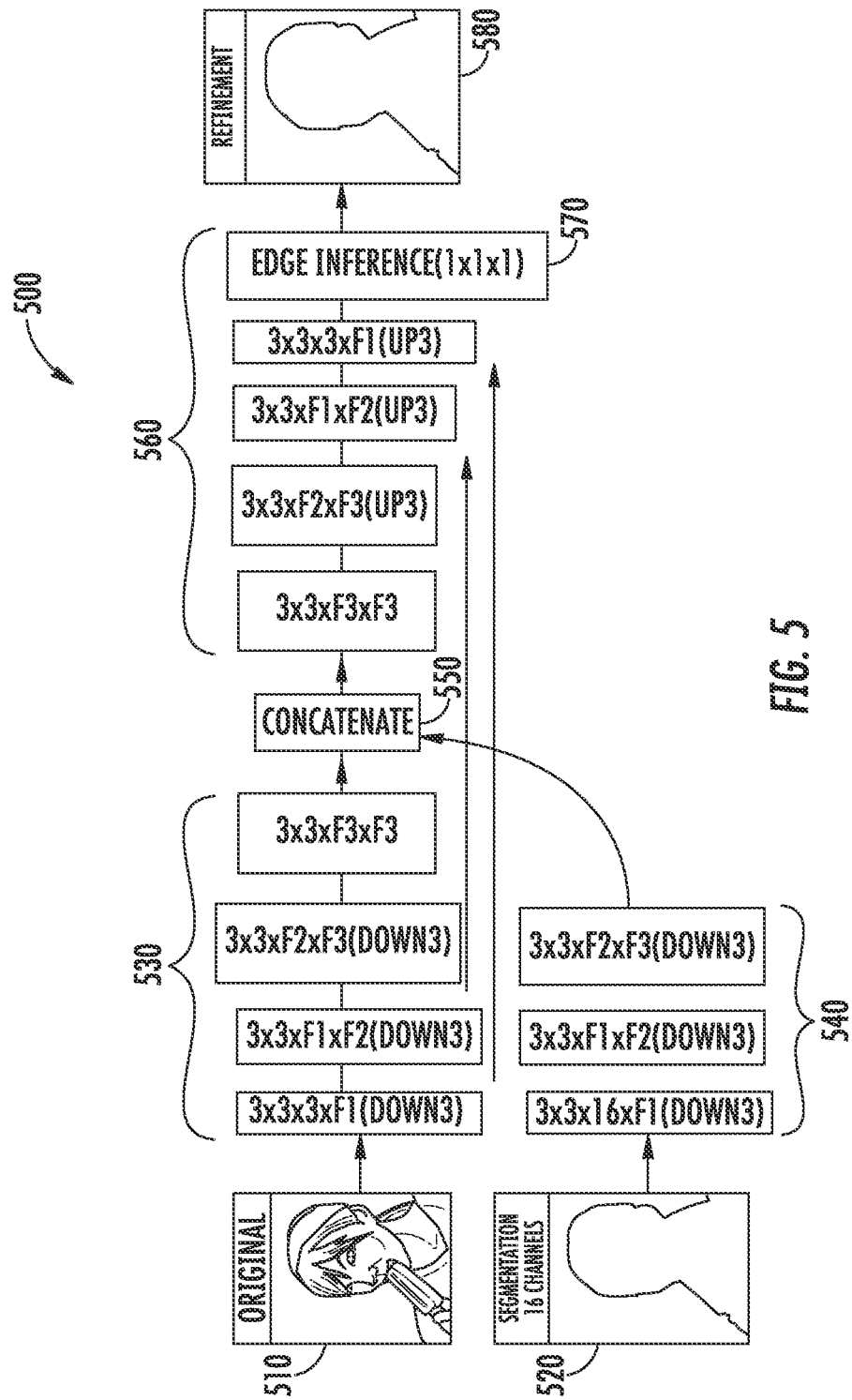
FIG. 5 depicts a block diagram of an example edge refinement neural network according to example aspects of the present disclosure.

Referring now to FIG. 5, an example edge refinement neural network 500 according to example aspects of the present disclosure is depicted. The example edge refinement neural network 500 depicted in FIG. 5 can be the same or similar to the edge refinement neural networks 220, 380, and 400 depicted in FIGS. 2-4, respectively.

As shown, an image 510 and a corresponding semantic segmentation mask 520 can be input into a respective first encoder network 530 and a second encoder network 540, respectively. Each encoder network 530, 540 can include a plurality of convolutional layers configured to encode the image 510 or the semantic segmentation mask 520, respectively.

The encoded image and encoded semantic segmentation mask can be concatenated by a concatenation component 550, and the concatenated output of the concatenation component 550 can be provided to the decoder network 560. The decoder network 560 can be configured to decode the concatenated output received from the concatenation component 550. The decoder network 560 can include a plurality of convolutional layers, including an edge inference layer 570. In some implementations, the refined semantic segmentation mask 580 can be received from an output of the decoder network 560, and more specifically as the output of an edge inference layer 570.

Figure 6:
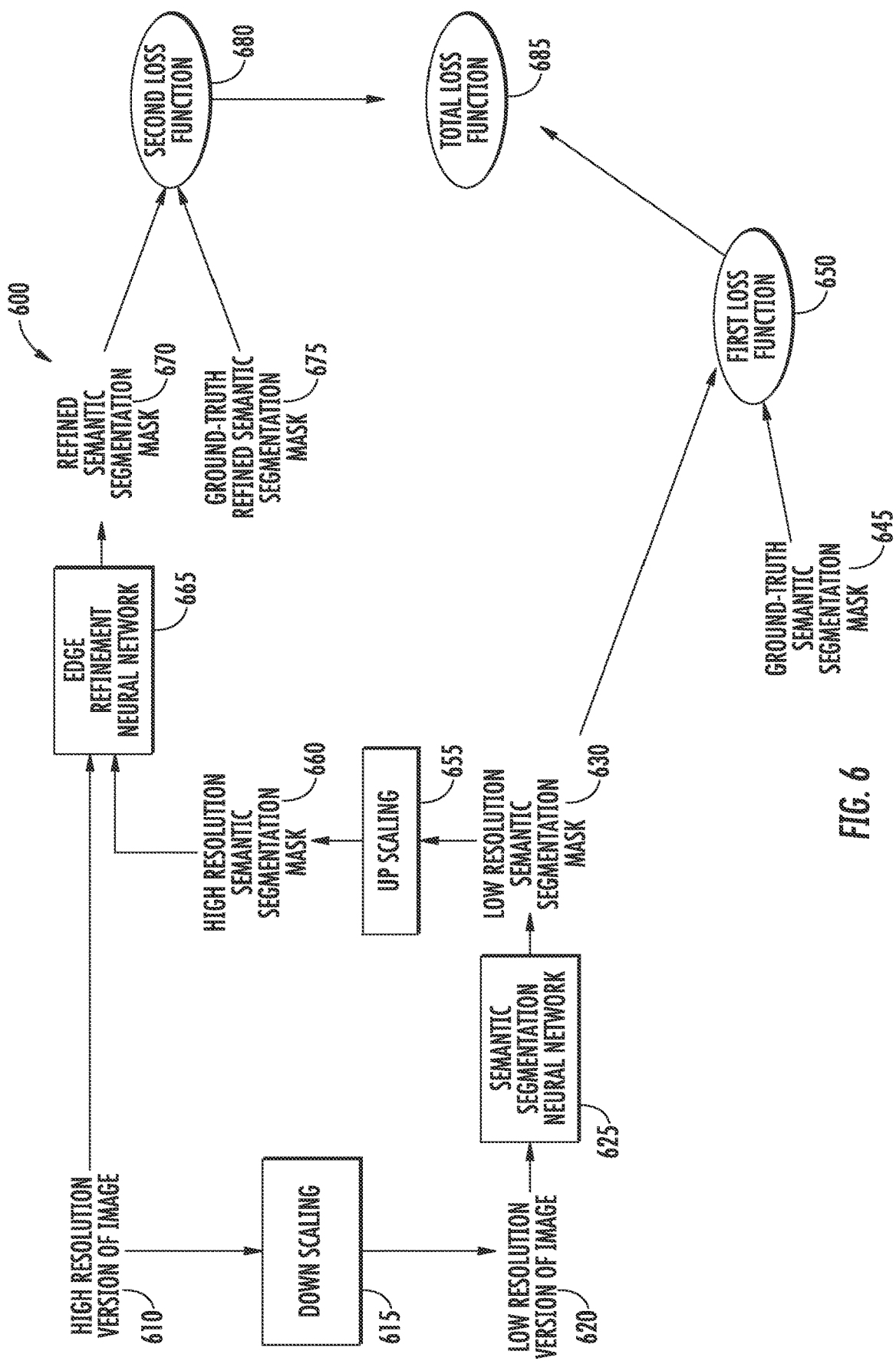
FIG. 6 depicts a block diagram of an example image segmentation model training process according to example aspects of the present disclosure.

Referring now to FIG. 6, a block diagram of an example image segmentation model training configuration 600 is depicted. An advantage provided by the image segmentation models according to example aspects of the present disclosure is the ability to train the image segmentation models from end to end, such as by back propagation of errors.

As shown, a training image, such as a high resolution version of an image 610 can be used to train the image segmentation model. The high resolution version of the image 610 can be a training image that is a part of a training dataset, which can include a ground-truth semantic segmentation mask 645 and a ground-truth refined semantic segmentation mask 675, as will be described in greater detail herein. As shown, the training image can be a high resolution version of the image 610. In some implementations, the training image can be a low resolution version of the image.

The high resolution version of the image 610 can be down-scaled by a down-scaling component 615 to generate a low resolution version of the image 620. The down-scaling components 615 can be, for example, the same or similar down-scaling component 320 shown in FIG. 3.

The low resolution version of the image 620 can be provided to the semantic segmentation neural network 625. The semantic segmentation neural network 625 can be the same or similar semantic segmentation neural network as the semantic segmentation neural networks 210 and 340 shown in FIGS. 2 and 3, respectively. The semantic segmentation neural network 625 can output a low resolution semantic segmentation mask 630. In some implementations, a high resolution version of the image can be input into the semantic segmentation neural network 625, which can output a corresponding high resolution semantic segmentation mask. In some implementations, the low resolution semantic segmentation mask 630 can include a plurality of channels, such as, for example, 16 channels.

In some implementations, a single channel of the low resolution semantic segmentation mask 630 can be extracted. For example, in some implementations, the low resolution semantic segmentation mask 630 can include a plurality of channels, such as 16 channels. In some implementations, a single channel of the low resolution semantic segmentation mask 630 can be extracted by the semantic segmentation neural network 625. For example, the semantic segmentation neural network 625 can include an inference layer configured to extract a single channel from a low resolution semantic segmentation mask 630.

In some implementations, the single channel of the low resolution semantic segmentation mask 630 can be compared to a ground-truth semantic segmentation mask 645. For example, the ground-truth semantic segmentation mask 645 can correspond to a ground-truth semantic segmentation mask 645 of the high resolution version of the image 610 compiled as part of a training dataset, and can be at the same resolution as the low resolution semantic segmentation mask. The ground-truth semantic segmentation mask 645 can be a desired output of a semantic segmentation neural network based on the image 610. A first loss function 650 can be determined based at least in part on a difference between the low resolution semantic segmentation mask 630 (or a single channel thereof) and the ground-truth semantic segmentation mask 645. In some implementations, a single channel for each channel of a low resolution semantic segmentation mask can be extracted, and each channel can be compared to a corresponding ground-truth semantic segmentation mask to determine a first loss function for that channel. In some implementations, the semantic segmentation mask 630 can include a plurality of channels, and the semantic segmentation mask 630 can be compared to a corresponding ground-truth semantic segmentation mask 645 to determine the first loss function.

In some implementations, the first loss function 650 can be used to train the semantic segmentation neural network 625. For example, the semantic segmentation neural network 625 can be trained by back propagating errors from the low resolution semantic segmentation mask 630 (or a single channel thereof) as compared to the ground-truth semantic segmentation mask 645.

The low resolution semantic segmentation mask 630 can be input into an up-scaling component 655 to determine a high resolution semantic segmentation mask 660. The upscaling component 655 can correspond to, for example, an up-scaling component 360 as shown in FIG. 3. In some implementations, the up-scaling component 655 can up-scale the low resolution semantic segmentation mask 630 into a high resolution semantic segmentation mask 660 at the same resolution as the high resolution version of the image 610.

As shown, the high resolution version of the image 610 (or at least a portion thereof) and the high resolution semantic segmentation mask 660 (or at least a portion thereof) can be input into the edge refinement neural network 665. The edge refinement neural network 665 can be the same or similar to the edge refinement neural networks 220, 380, 400, and 500 as shown in FIGS. 2-5, respectively. In some implementations, the high resolution version of the image 610 can be randomly cropped, and a corresponding crop of the high resolution semantic segmentation mask 660 can similarly be cropped, with the two cropped portions provided to the edge refinement neural network 665.

A refined semantic segmentation mask 670 can be received as an output from the edge refinement neural network 665. The refined semantic segmentation mask 670 can then be compared to a ground-truth refined semantic segmentation mask 675. For example, the ground-truth refined semantic segmentation mask 675 can correspond to a ground-truth refined semantic segmentation mask 675 of the high resolution version of the image 610 compiled as part of a training dataset. The ground-truth refined semantic segmentation mask 675 can be a desired output of the edge refinement neural network 665 corresponding to the high resolution version of the image 610.

In some implementations, a second loss function 680 can be determined based at least in part on a difference between the refined semantic segmentation mask 670 and the ground-truth refined semantic segmentation mask 675. In some implementations, the second loss function 680 can be used to train the edge refinement neural network 665. For example, the edge refinement neural network 665 can be trained by back propagating errors from the refined semantic segmentation mask 670 as compared to the ground-truth refined semantic segmentation mask 675.

In some implementations, a total loss function 685 can be determined based at least in part on the first loss function 650 and the second loss function 680. For example, in some implementations, the total loss function 685 can be determined by summing the first loss function 650 and the second loss function 680.

In some implementations, the image segmentation model can be trained based at least in part on the total loss function 685. For example, the image segmentation model can be trained by back propagating errors based on the total loss function 685 through the image segmentation model. In this way, the image segmentation model can be trained from end to end.

In some implementations, the image segmentation model can be trained by first determining a first loss function 650, and training the semantic segmentation neural network 630 based at least in part on the first loss function 650. Once the semantic segmentation neural network 630 has been trained to achieve a first loss function 650 below an acceptable threshold, the edge refinement neural network 665 can be trained based at least in part on the second loss function 680. Once the edge refinement neural network 665 has been trained to achieve a second loss function 680 below an acceptable threshold, the image segmentation model can be trained based at least in part on the total loss function 685, as described herein.

Figure 7:
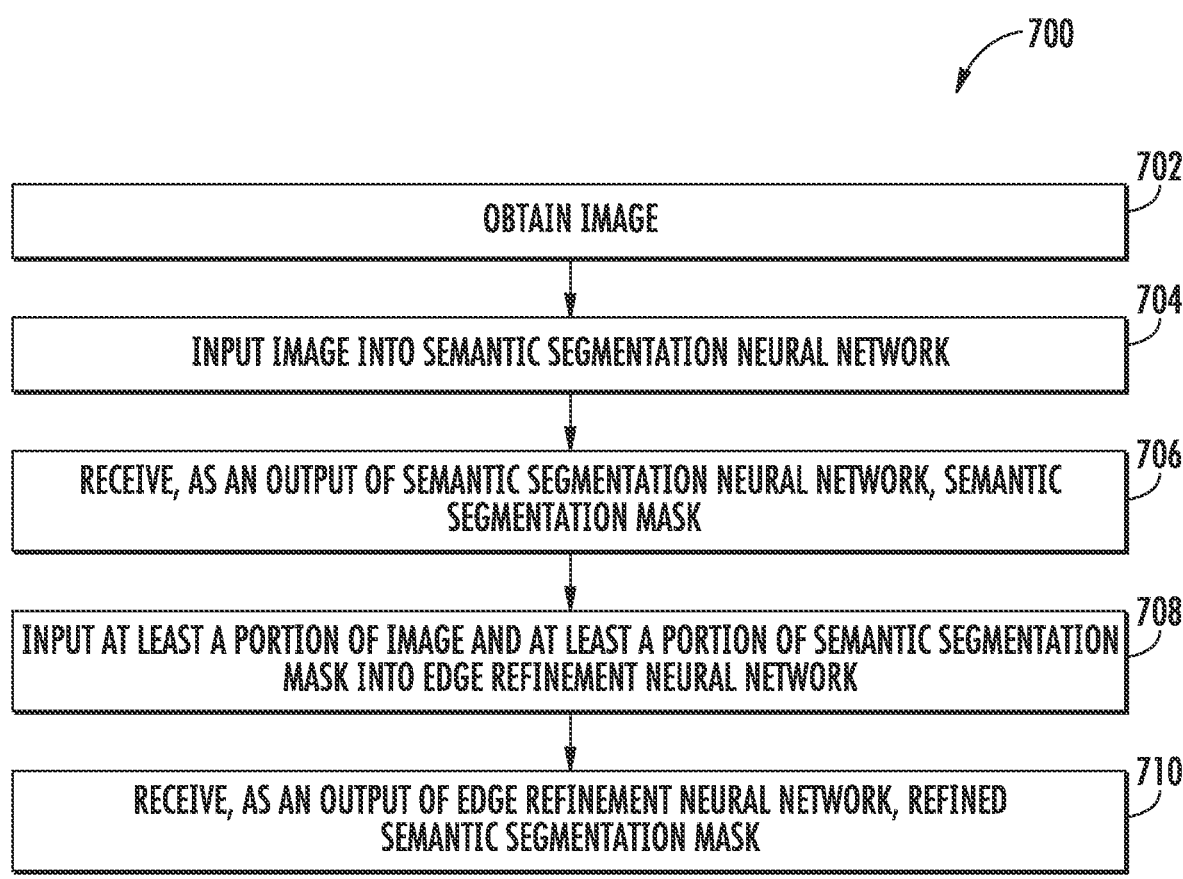
FIG. 7 depicts a flow chart diagram of an example method to determine a refined semantic segmentation mask according to example aspects of the present disclosure.

Referring now to FIG. 7, a flow chart diagram of an example method (700) to determine a refined semantic segmentation mask according to example aspects of the present disclosure is depicted. Although FIG. 7 depicts steps performed in a particular order for purposes of illustration and discussion, the methods of the present disclosure are not limited to the particularly illustrated order or arrangement. The various steps of method (700) can be omitted, rearranged, combined, and/or adapted in various ways without deviating from the scope of the present disclosure.

At (702), the method (700) can include obtaining an image. For example, in some implementations, a user can use a user computing device 102 to select an image to be provided to an image segmentation model 120. In some implementations, the image segmentation model 120 can be stored on the user computing device 102, and in other implementations, the image segmentation model 140 can be stored on a computing system 130 remote from the user computing device 102.

At (704), the method (700) can include inputting the image into a semantic segmentation neural network. For example, the image segmentation model 200 can include a first neural network 210 and a second neural network 220. The first neural network 210 can be a semantic segmentation neural network 210 configured to determine a semantic segmentation mask 240 of an image 230. The image 230 can be input into the semantic segmentation neural network 210.

At (706), the method (700) can include receiving, as an output of the semantic segmentation neural network, a semantic segmentation mask. For example, the semantic segmentation neural network 210 can be configured to output a semantic segmentation mask 240 for the image 230.

At (708), the method (700) can include inputting at least a portion of the image and at least a portion of the semantic segmentation mask into an edge refinement neural network. For example, the image segmentation model 200 can include a second neural network 220, which can be an edge refinement neural network 220. The image 230 (or least a portion thereof) and the semantic segmentation mask 240 (or least a portion thereof) can be input into the edge refinement neural network 220.

At (710), the method (700) can include receiving, as an output of the edge refinement neural network, a refined semantic segmentation mask. For example, the edge refinement neural network 220 can be configured to output a refined semantic segmentation mask 250 based at least in part on an image 230 and a semantic segmentation mask 240. The refined semantic segmentation mask 250 can be received as an output of the edge refinement neural network 220. The refined semantic segmentation mask 250 can be refined by, for example, having a higher resolution, more clearly defined boundaries, more accurate boundaries, or other refinement as compared to the semantic segmentation mask 240.

In some implementations, at least a portion of the image can be blurred based at least in part on the refined semantic segmentation mask. For example, the refined semantic segmentation mask can delineate boundaries between an object in a foreground of the image and a background of the image. In some implementations, the background portion of the image can be blurred, whereas the foreground portion of the image can remain as in the original image.

In this way, a refined semantic segmentation mask can be determined for an image using an image segmentation model comprising a first neural network, and a second neural network.

Figure 8:
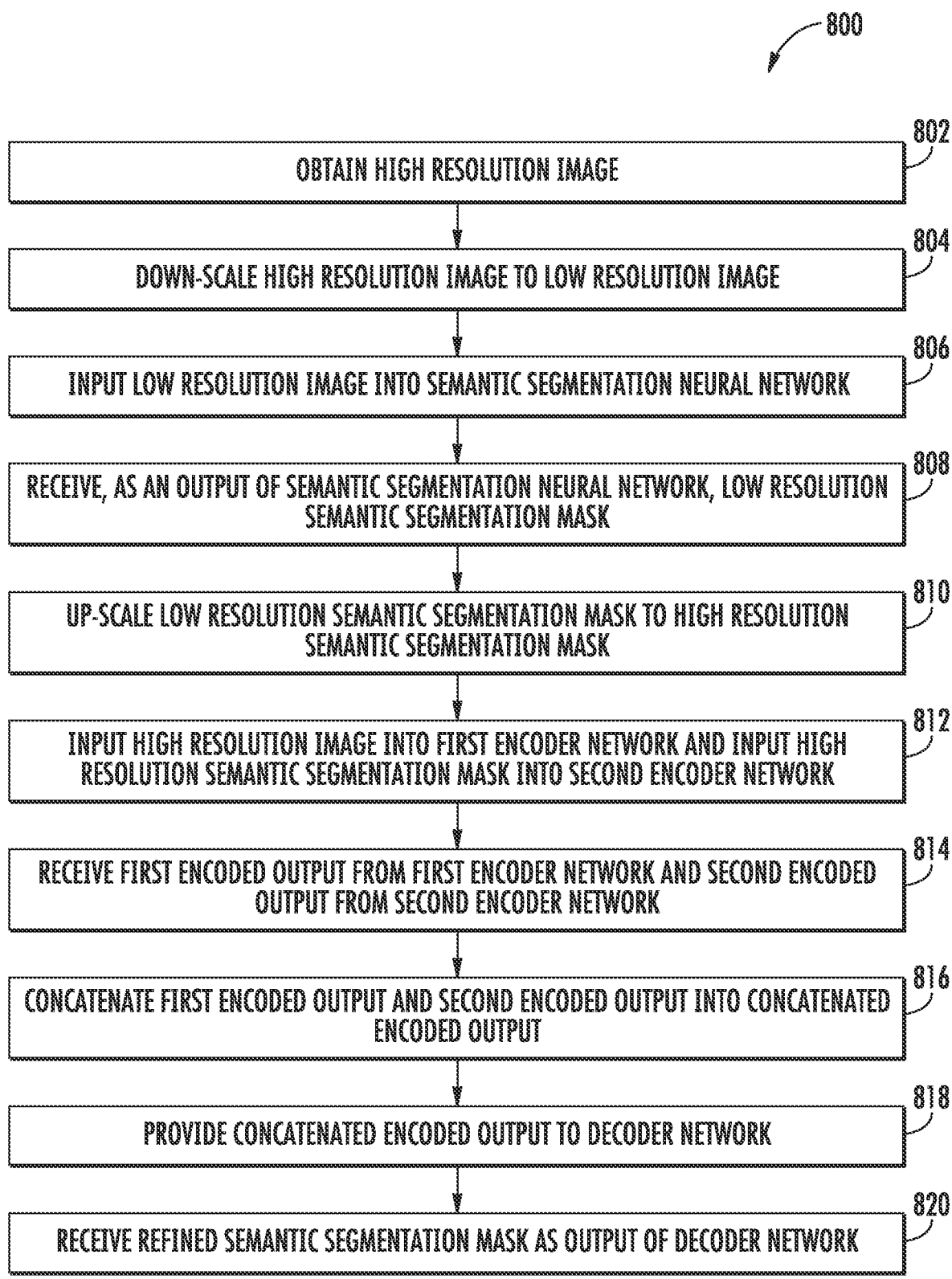
FIG. 8 depicts a flow chart diagram of an example method to determine a refined semantic segmentation mask according to example aspects of the present disclosure.

Referring now to FIG. 8, a flow chart diagram of an example method (800) to determine a refined semantic segmentation mask according to example aspects of the present disclosure is depicted. Although FIG. 8 depicts steps performed in a particular order for purposes of illustration and discussion, the methods of the present disclosure are not limited to the particularly illustrated order or arrangement. The various steps of method (800) can be omitted, rearranged, combined, and/or adapted in various ways without deviating from the scope of the present disclosure.

At (802), the method (800) can include obtaining a high resolution image. For example, in some implementations, a user can use a user computing device 102 to select an image to be provided to an image segmentation model 120. In some implementations, the image segmentation model 120 can be stored on the user computing device 102, and in other implementations, the image segmentation model 140 can be stored on a computing system 130 remote from the user computing device 102. The image can be, for example, an image at a first resolution, which is a higher resolution than a second resolution.

At (804), the method (800) can include down-scaling the high resolution image to a low resolution image. For example, the high resolution image can be downscaled from the first resolution to the second resolution, where the second resolution is a lower resolution than the first resolution.

At (806), the method (800) can include inputting the low resolution image into a semantic segmentation neural network. For example, the image segmentation model can include a first neural network and a second neural network. The first neural network can be a semantic segmentation neural network configured to receive an image and output a semantic segmentation mask based on the image.

At (808), the method (800) can include receiving, as an output of the semantic segmentation neural network, a low resolution semantic segmentation mask. For example, the low resolution semantic segmentation mask can be at the same resolution as the low resolution version of the image that was provided to the semantic segmentation neural network.

At (810), the method (800) can include up-scaling the low resolution semantic segmentation mask to a high resolution semantic segmentation mask. For example, the low resolution semantic segmentation mask can be up-scaled from the second resolution to the first resolution.

At (812), the method (800) can include inputting the high resolution image (or a portion thereof) into a first encoder network and inputting the high resolution semantic segmentation mask (or a portion thereof) into a second encoder network. For example, the image segmentation model can also include a second neural network, which can be an edge refinement neural network. The edge refinement neural network can include a first encoder network and a second encoder network. The image (or a portion thereof) can be input into the first encoder network, and the semantic segmentation mask (or a portion thereof) can be input into the second encoder network. Each encoder network can be configured to encode the respective input using one or more convolutional layers, wherein each convolutional layer performs an encoding function.

At (814), the method (800) can include receiving a first encoded output from the first encoder network and a second encoded output from the second encoder network. For example, the first encoder network can receive the high resolution image (or a portion thereof) and can encode the image into a first encoded output. Similarly, the second encoder network can receive the semantic segmentation mask (or a portion thereof) and can encode the semantic segmentation mask into a second encoded output.

At (816), the method (800) can include concatenating the first encoded output and the second encoded output into a concatenated encoded output. For example, after each of the first encoder network and the second encoder network have respectively encoded the image and the semantic segmentation mask, the first and second encoded outputs can be concatenated. In some implementations, each encoder network can be configured to reduce the resolution of the respective input at each convolutional layer. In some implementations, the first encoded output and the second encoded output can be concatenated when their respective resolutions are at their lowest.

At (818), the method (800) can include providing the concatenated encoded output to a decoder network. For example, the edge refinement neural network can include a decoder network configured to decode the concatenated encoded output. The concatenated encoded output can be provided to the decoder network in order to allow the decoder network to decode the concatenated encoded output.

At (820), the method (800) can include receiving a refined semantic segmentation mask as an output of the decoder network. For example, the decoder network can be configured to decode the concatenated encoded output using one or more convolutional layers, wherein each convolutional layer performs a decoding function. In some implementations, each convolutional layer of the decoder network can respectively increase the resolution of the concatenated encoded output. In some implementations, an edge inference layer can be used to extract the refined semantic segmentation mask once the concatenated encoded output has been decoded to a maximum and/or original resolution. The refined semantic segmentation mask can be received as an output of the edge refinement neural network.

Figure 9:
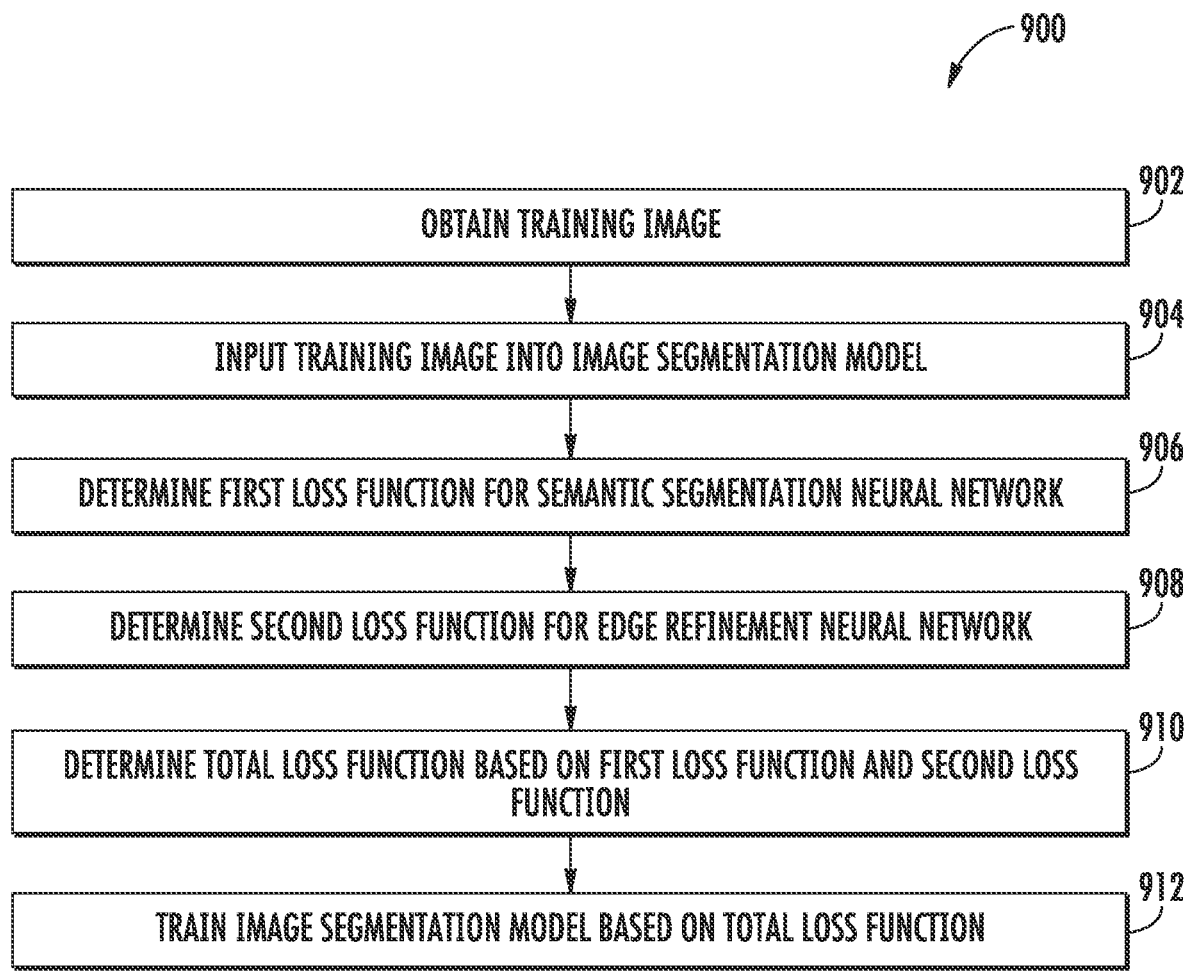
FIG. 9 depicts a flow chart diagram of an example method to train an image segmentation model according to example aspects of the present disclosure.

Referring now to FIG. 9, a flow chart diagram of an example method (900) to train an image segmentation model according to example aspects of the present disclosure is depicted. Although FIG. 9 depicts steps performed in a particular order for purposes of illustration and discussion, the methods of the present disclosure are not limited to the particularly illustrated order or arrangement. The various steps of method (900) can be omitted, rearranged, combined, and/or adapted in various ways without deviating from the scope of the present disclosure.

At (902), the method (900) can include obtaining a training image. For example, a training image can be a part of a training dataset used to train the image segmentation model. Each training image can have one or more corresponding ground-truth semantic segmentation masks and/or one or more corresponding ground-truth refined semantic segmentation masks. The training image can be obtained by, for example, accessing the training dataset.

At (904), the method (900) can include inputting the training image into an image segmentation model. For example, an image segmentation model can include a first neural network and a second neural network. The first neural network can be, for example, a semantic segmentation neural network, and the second neural network can be, for example, an edge refinement neural network. The training image can be input into the semantic segmentation neural network in order to generate a semantic segmentation mask. The image (or at least a portion thereof), and the semantic segmentation mask (or least a portion thereof), can be input into the edge refinement neural network. The edge refinement neural network can then provide a refined semantic segmentation mask.

In some implementations, the training image can be a high resolution training image. In some implementations, the high resolution training image can be down-scaled into a low resolution training image, and the low resolution training image can be input into the semantic segmentation neural network.

At (906), the method (900) can include determining a first loss function for the semantic segmentation neural network. For example, the training image can be input into the semantic segmentation neural network, and a semantic segmentation mask can be received as an output of the semantic segmentation neural network. For example, in some implementations, the semantic segmentation mask can include a plurality of channels, and a single channel of the semantic segmentation mask can be extracted. For example, in some implementations, an inference layer of the semantic segmentation neural network can be used to extract a single channel of the semantic segmentation mask. The first loss function can then be determined based at least in part on a difference between the semantic segmentation mask (or a single channel thereof) and a ground-truth semantic segmentation mask. For example, the semantic segmentation mask can be compared to the ground-truth semantic segmentation mask, and the first loss function can be determined which describes a difference between the semantic segmentation mask and the ground-truth semantic segmentation mask.

In some implementations, the semantic segmentation neural network can then be trained based at least in part on the first loss function. For example, the semantic segmentation neural network can be trained by back propagating errors based on the first loss function.

At (908), the method (900) can include determining a second loss function for the edge refinement neural network. For example, the training image (or least a portion thereof, and the semantic segmentation mask (or least a portion thereof) can be input into the edge refinement neural network to determine the refined semantic segmentation mask. The refined semantic segmentation mask can be received as an output of the edge refinement neural network. The second loss function can be determined based at least in part on a difference between the refined semantic segmentation mask and a ground-truth to segmentation mask. For example, the refined semantic segmentation mask can be compared to the ground-truth refined semantic segmentation mask, and the second loss function can be determined which describes a difference between the refined semantic segmentation mask and the ground-truth refined semantic segmentation mask.

In some implementations, the edge refinement neural network can then be trained based at least in part on the second loss function. For example, the edge refinement neural network can be trained by back propagating errors based on the second loss function.

In some implementations, the semantic segmentation mask received as an output of the semantic segmentation neural network can be a low resolution semantic segmentation mask. In some implementations, at least a portion of a high resolution training image can be input into the edge refinement neural network, and the low resolution semantic segmentation mask can be up-scaled into a high resolution semantic segmentation mask, and at least a portion of the high resolution semantic segmentation mask can be input into the edge refinement neural network.

At (910), the method (900) can include determining a total loss function based at least in part on the first loss function and the second loss function. For example, in some implementations, the total loss function can be determined by summing the first loss function and the second loss function. The total loss function can describe the total loss for the image segmentation model.

At (912), the method (900) can include training the image segmentation model based at least in part on the total loss function. For example, the image segmentation model can be trained from end to end based on the total loss function, which describes the total losses and/or errors for the image segmentation model. In some implementations, the image segmentation model can be trained by back propagating errors through the image segmentation model based on the total loss function. In this way, the image segmentation model according to example aspects of the present disclosure can be trained from end to end, thereby allowing for continual improvement as new training data is provided to the image segmentation model.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, comprising:
  at least one processor;
  a machine-learned image alteration model comprising:
    a first neural network, wherein the first neural network is trained to receive an image and, in response to receipt of the image, output an altered mask of the image, wherein the first neural network has been trained using a first loss function, wherein the first loss function is determined between a semantic segment of the image and a previously-determined semantic segmentation of the image, and the first neural network is trained by back propagating errors from the semantic segment of the image compared to the previously-determined semantic segmentation of the image; and
    a second neural network, wherein the second neural network is trained to receive at least a portion of the image and at least a portion of the altered mask and, in response to receipt of the at least a portion of the image and at least a portion of the altered mask, output a refined mask, wherein the second neural network has been trained using second loss function, wherein the second loss function is determined by a difference between the refined mask and a previously-determined refined semantic segmentation mask, and the second neural network is trained by back-propagating errors from the refined semantic segmentation mask compared to the previously-determined refined-semantic segmentation mask; and
  at least one tangible, non-transitory computer-readable medium that stores instructions that, when executed by the at least one processor, cause the at least one processor to perform operations, the operations comprising:
    obtaining the image;
    inputting the image into the first neural network;
    receiving, as an output of the first neural network, the altered mask, the altered mask comprising an alteration of at least a portion of the image, the alteration indicating the semantic segment of the image;
    inputting at least a portion of the image and at least a portion of the altered mask into the second neural network; and
    receiving, as an output of the second neural network, the refined mask, wherein the refined mask includes one or more refinements to the altered mask.

2. The computing system of claim 1, wherein the operations further comprise:
  blurring at least a portion of the image based at least in part on the refined mask.

3. The computing system of claim 1, wherein the image comprises a high resolution image; and
  wherein inputting the image into the first neural network comprises:
  down-scaling the high resolution image into a low resolution image; and
  inputting the low resolution image into the first neural network.

4. The computing system of claim 3, wherein receiving, as an output of the first neural network, the altered mask comprises:
  receiving, as an output of the first neural network, a low resolution altered mask.

5. The computing system of claim 4, wherein inputting at least a portion of the altered mask into the second neural network further comprises:
  up-scaling the low-resolution altered mask into a high resolution altered mask; and
  inputting at least a portion of the high resolution altered mask into the second neural network.

6. The computing system of claim 3, wherein inputting at least a portion of the image into the second neural network comprises inputting at least a portion of the high resolution image into the second neural network.

7. The computing system of claim 1, wherein
  inputting at least a portion of the image into the second neural network comprises inputting the at least a portion of the image into a first encoder network of the second neural network; and
  wherein inputting at least a portion of the altered mask into the second neural network comprises inputting the at least a portion of the altered mask into a second encoder network of the second neural network.

8. The computing system of claim 7, wherein inputting at least the portion of the image and at least the portion of the altered mask into the second neural network further comprises:
receiving a first encoded output from the first encoder network;
receiving a second encoded output from the second encoder network; and
concatenating the first encoded output and the second encoded output into a concatenated encoded output.

9. The computing system of claim 8, wherein inputting at least the portion of the image and at least the portion of the altered mask into the second neural network further comprises:
providing the concatenated encoded output to a decoder network of the second neural network; and
wherein receiving, as an output of the second neural network, the refined altered mask comprises receiving the refined altered mask as an output of the decoder network.

10. The computing system of claim 1, wherein the machine-learned image alteration model was trained from end to end based at least in part on a total loss function for the machine-learned image alteration model.

11. A computer-implemented method of generating an altered mask for at least a part of an image, comprising:
receiving, at a first neural network, first data derived from the image,
processing said first data, using the first neural network, to generate an output of the first neural network, wherein said output relates to a first altered mask, the alteration indicating a semantic segment of the image, wherein the first neural network has been trained first loss function, wherein the first loss function is determined between the semantic segment of the image and a previously-determined semantic segmentation of the image, and the first neural network is trained by back propagating errors from the semantic segment of the image compared to the previously-determined semantic segmentation of the image;
receiving, at a second neural network:
second data derived from the image, and
data derived from said output of the first neural network; and
generating data relating to a second altered mask, comprising processing, using the second neural network, the second data derived from the image and the data derived from said output of the first neural network, such that the second altered mask includes one or more refinements to the first altered mask, wherein the second neural network has been trained using a second loss function, wherein the second loss function is determined by a difference between the second altered mask and a previously-determined refined semantic segmentation mask, and the second neural network is trained by back-propagating errors from the second altered mask compared to the previously-determined refined-semantic segmentation mask.

12. The computer-implemented method as claimed in claim 11, wherein the first data comprises image data at a first resolution and wherein the second data comprises image data at a second resolution which is higher than the first resolution.

13. The computer-implemented method as claimed in claim 12, further comprising generating the first data, wherein generating the first data comprises reducing the resolution of at least a region of the image.

14. The computer-implemented method as claimed in claim 11, wherein the first altered mask has a first resolution and wherein the second altered mask has a second resolution which is higher than the first resolution.

15. The computer-implemented method as claimed in claim 11, wherein the first neural network and/or the second neural network comprise one or more convolutional layers.

16. The computer-implemented method as claimed in claim 11, wherein the second neural network comprises:
at least two heads, wherein a first head is configured to receive the second data derived from the image, and a second head is configured to receive the data derived from an output of the first neural network; and
a concatenation component configured to concatenate data derived from the first and second heads.

17. The computer-implemented method as claimed in claim 16, wherein the second neural network further comprises a decoder network configured to receive data derived from an output of the concatenation component, wherein the first head comprises a first encoder network and the second head comprises a second encoder network.

18. A computer-implemented method of training an image alteration model from end to end, the image alteration model comprising a first neural network and a second neural network, the method comprising:
inputting a training image into the image alteration model;
determining a first loss function for the first neural network;
determining a second loss function for the second neural network;
determining a total loss function based at least in part on the first loss function and second loss function; and
training the image alteration model based on the total loss function;
wherein the first neural network is trained to receive an image and, in response to receipt of the image, output an altered mask, wherein the altered mask indicates a semantic segment of the image, wherein the first loss function is determined between the semantic segment of the image and a previously-determined semantic segmentation of the image, and the first neural network is trained by back propagating errors from the semantic segment of the image compared to the previously-determined semantic segmentation of the image; and
wherein the second neural network is trained to receive at least a portion of the image and at least a portion of the altered mask and, in response to receipt of the at least a portion of the image and at least a portion of the altered mask, output a refined altered mask, wherein the refined altered mask includes one or more refinements to the altered mask, wherein the second loss function is determined by a difference between the refined altered mask and a previously-determined refined semantic segmentation mask, and the second neural network is trained by back-propagating errors from the refined semantic segmentation mask compared to the previously-determined refined-semantic segmentation mask.

19. The computer-implemented method of claim 18, wherein determining the total loss function based at least in part on the first loss function and second loss function comprises summing the first loss function and the second loss function.

20. The computer-implemented method of claim 18, wherein training the image alteration model based on the total loss function comprises:
training the first neural network based at least in part on the first loss function; and training the second neural network based at least in part on the second loss function.

* * * * *